April 8, 1958 K. SASS 2,830,126
TELEPHONE EXCHANGE CIRCUIT
Filed June 16, 1954
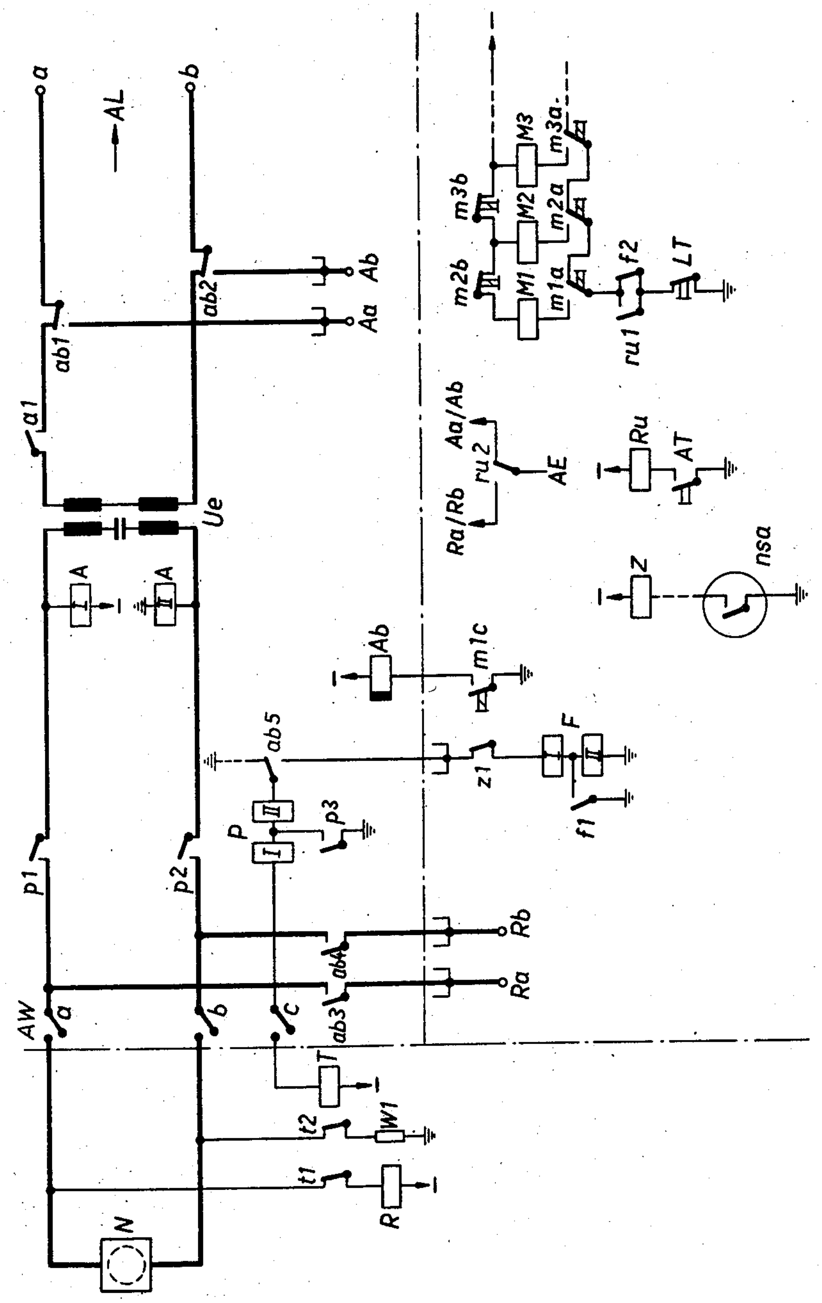
INVENTOR
K. SASS
BY Robert Harding Jr.
ATTORNEY 2,830,126
Patented Apr. 8, 1958

1

2,830,126

TELEPHONE EXCHANGE CIRCUIT

Karl Sass, Stuttgart-Stammheim, Germany, assignor to International Standard Electric Corporation, New York, N. Y., a corporation of Delaware Application June 16, 1954, Serial No. 437,125

Claims priority, application Germany June 30, 1953

4 Claims. (Cl. 179—27)

The invention relates to telephone exchanges of the kind in which the incoming calls are accepted and transferred by a master station seizing them by means of keys and relays. P. B. X systems are included in this type. When in prior arrangements of this type an incoming call is to be extended to its destination, the operator at the master station has to perform the following manipulations:

(1) Operate the answering key,
(2) Operate a connection key,
(3) Operate the key sender,
(4) Operate a release key in order to return the circuit to normal.

The invention has for its object to simplify the mode of operating these exchanges and, in particular, to minimize the number of operations. To achieve this, the invention employs switching means by which the master station is disconnected automatically if the subscriber's line is idle. Owing to this principle, no more than two operations are necessary for the transference of an incoming office call, viz., the operation of the answering key and the pulsing operation.

A further feature of the invention is that the master station employs magnetic keys to connect to the respective office line in order to accept and transfer the incoming call. Furthermore, a circuit extending over the connecting device to the desired subscriber's line, and constituted, preferably, by the respective test wire, contains switching means which responds to the idle condition of the subscriber's line to break the circuit of the magnetic keys. According to a further development of the invention these switching means become connected to the said wire by contacts of a relay after the master station has accomplished its pulsing. When the pulses stored in the key sender, or those produced by a dial switch, have been delivered to the next following connection device, then, with the subscriber's line idle, the respective magnetic key will be released automatically.

Still another feature of the invention is that, with the desired subset busy, switching means will act to switch the master station from the answering line to a separate offering line, that is to say, in this event the master station will not be disconnected and will thus be able to connect to the busy subset in order to inform this subset of the call intended for it.

The invention is more fully described hereafter, reference being had to the accompanying drawing. The arrangement here illustrated has magnetic keys by means of which the master station can join the respective office line. It is, however, possible for this arrangement to be so altered as to use relays and conventional keys instead of the magnetic keys.

Assume that over line AL a call has reached the master station. The operator at this station connects the respective office line and assigns it to the desired subset N. In order to do this, the operator actuates the magnetic key allocated to said office line. A number of these

2 keys have been shown, each with a magnet which, when energized, holds the key in its operated position. The magnets for the several keys have been indicated at M1, M2, M3, and each each key has a number of contacts identified by *m* followed by the number of the key and a letter corresponding to the particular contact of that key.

Assume that key M1 has been depressed, this being the key associated with the office line AL. Key M1, when operated, has its holding magnet M1 energized by being inerted by means of its contact *m1a* in a holding circuit, viz:

—, key contacts not shown,
*m3b*, *m2b*, M1, *m1a*, *f2*, LT, +

The answering relay A*b* of the office repeater for that particular office line responds over contact *m1c* of M1. The contacts *ab1*, *ab2* of AB are hence switched to join the wires A*a*, A*b* and thus the operator's apparatus to the office. The operator can now hear the caller's wishes and then transfer the call to the desired subset N by means of a key sender or a dial switch. Each impulse train so sent operates the contact *nsa* and thereby completes the circuit of a relay Z. The pulsing of this relay also acts to set the office selector AW to the subset N in a well known manner, so as to complete the test circuit —, T, AW(*c*), P(I, II), *ab5*, *z1*, F(I, II), +

*ab5* being a contact of A*b*. The common relay F first energizes alone in this circuit. Its contact *f2* opens the holding circuit of key M1. This key therefore returns to normal. Contact *f1* of F closes to short the coil II of F and thus intensifies the current in wire *c* of AW, with the result that now the relay P of the particular office selector and the relay T in the substation circuit respond in addition to F.

If subset N be busy, relay F will not be able to respond, since in this event the potential applied to the test wire *c* by contact *p3* of another relay P which is associated with another office selector acts through the multiple to short the relay F. Consequently key M1 will not be released automatically. By means of a key AT, the operator may now connect her telephone set, represented by the reference character AE, to line R*a*, R*b* and thus to the conversation being conducted, because over key AT, closed, the relay R*u* energizes, whereby its contact *ru2* is switched to disconnect the operator's apparatus AE from line A*a*/A*b* and to connect it to line R*a*/R*b*. The contacts *ab3*, *ab4* of relay A*b* have closed the line R*a*/R*b*, this relay having energized as stated. Over R*a*/R*b* the operator can hence inform the party at N of the fact that there is another call intended for subset N. Thereupon she actuates the cancel key LT to release the key M1.

The arrangement may be such that the magnetic keys M1, M2, M3, etc., of which each belongs to a definite office line, will be released automatically by the operator seizing another office line.

Though the means F, serving to release the magnetic keys, are here shown as included in the test wire *c*, yet additional wires may be provided for this purpose.

What is claimed is:

1. A telephone system comprising a plurality of substations, a master station, a central exchange, office lines connected to said central exchange, separate magnetic key means, one for each office line, at said master station for selectively connecting said master station to said associated office line, circuit means for holding a key operated once it has been manually operated, manually operable means at said master station for selectively preparing the connections of one of said sub-stations to the office line connected to said master station, test means effective when the connection of a sub-station to an office line is prepared and adapted to operate in response to the idle condition of said sub-station, means controlled by the operation of said test means for disconnecting said master station from said office line and for connecting said sub-station to said office line, and means controlled by the operation of said test means for opening said circuit means so as to release the operated key when said test means responds to an idle condition on the selected sub-station.

2. A telephone system, as defined in claim 1, in which the manually operable means for selectively preparing the connection of a substation to an office line includes a connecting device and the test means comprises a test wire which connects to a substation over said connecting device, and the means for opening the circuit means includes switching means connected to said test wire.

3. A telephone system, as defined in claim 2, in which the manually operable means comprises pulse-producing means, and a relay responsive to the pulses produced by said pulse-producing means, for operating the connecting device.

4. A telephone system, as defined in claim 1, further comprising additional key means for opening the circuit means and thus releasing an operated key if the test has not operated upon the preparation of a substation connection.

References Cited in the file of this patent

UNITED STATES PATENTS

| | | |
|---|---|---|
| 1,079,533 | Aitken | Nov. 24, 1913 |
| 2,184,540 | Wright et al. | Dec. 26, 1939 |
| 2,365,996 | Bakkes | Dec. 26, 1944 |
| 2,424,563 | Gohorel | July 29, 1947 |
| 2,496,902 | Voss | Feb. 7, 1950 |
| 2,567,190 | Deakin | Sept. 11, 1951 |